US010014794B2

(12) United States Patent
Lei et al.

(10) Patent No.: US 10,014,794 B2
(45) Date of Patent: Jul. 3, 2018

(54) POWER INVERTER ASSEMBLY FOR A VEHICLE

(71) Applicant: Ford Global Technologies, LLC, Dearborn, MI (US)

(72) Inventors: Guangyin Lei, Dearborn Heights, MI (US); Michael W. Degner, Novi, MI (US); Chingchi Chen, Ann Arbor, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 14/811,280

(22) Filed: Jul. 28, 2015

(65) Prior Publication Data

US 2017/0033704 A1    Feb. 2, 2017

(51) Int. Cl.
| | | |
|---|---|---|
| *H05K 7/00* | (2006.01) | |
| *H02M 7/00* | (2006.01) | |
| *B60R 16/03* | (2006.01) | |
| *H02B 1/20* | (2006.01) | |
| *H02B 1/26* | (2006.01) | |
| H02M 7/5387 | (2007.01) | |
| H02M 1/00 | (2006.01) | |

(52) U.S. Cl.
CPC ............ *H02M 7/003* (2013.01); *B60R 16/03* (2013.01); *H02B 1/20* (2013.01); *H02B 1/26* (2013.01); *H02M 7/53875* (2013.01); *H02M 2001/007* (2013.01)

(58) Field of Classification Search
CPC ... B60R 16/03; H02M 7/003; H02M 7/53875; H02M 2001/007; H02B 1/16; H02B 1/20

USPC .............................................. 361/821
See application file for complete search history.

(56) References Cited

U.S. PATENT DOCUMENTS

| | | | | |
|---|---|---|---|---|
| 6,240,637 | B1 | 6/2001 | Ikeda et al. | |
| 6,249,448 | B1 * | 6/2001 | Regnier | H01G 4/38 361/821 |
| 6,493,249 | B2 * | 12/2002 | Shirakawa | H02M 7/003 363/147 |
| 6,943,445 | B2 * | 9/2005 | Shirakawa | H01L 23/5383 257/723 |
| 7,670,163 | B2 * | 3/2010 | Kauranen | H01G 9/012 439/212 |
| 7,835,151 | B2 | 11/2010 | Olesen | |

(Continued)

*Primary Examiner* — Hung S Bui
(74) *Attorney, Agent, or Firm* — David B. Kelley; Brooks Kushman P.C.

(57) ABSTRACT

An electronic device for an electric powertrain of a vehicle is disclosed. The device includes a power module assembly having a housing that defines a first side, and an array of power modules disposed within the housing. Each of the power modules includes first electrical contact patches at least partially embedded in the first side and having an attachment surface substantially parallel to the first side. A capacitor assembly includes a housing defining a second side that is substantially coplanar with the first side, and an array of second electrical contact patches at least partially embedded in the second side. The second electrical contact patches have an attachment surface substantially parallel to the second side. A busbar mechanically and electrically couples at least one of the first contact patches to at least one of the second contact patches.

20 Claims, 7 Drawing Sheets

(56) References Cited

U.S. PATENT DOCUMENTS

| | | | | |
|---|---|---|---|---|
| 7,869,193 | B2* | 1/2011 | Nohara | H02M 5/271 |
| | | | | 361/624 |
| 8,410,640 | B2* | 4/2013 | Gotou | H01L 25/115 |
| | | | | 307/147 |
| 9,795,049 | B2* | 10/2017 | Tada | H05K 7/1432 |
| 2002/0182480 | A1 | 12/2002 | Hanauer et al. | |
| 2012/0328920 | A1 | 12/2012 | Takase et al. | |
| 2013/0309553 | A1 | 11/2013 | Kinoshita et al. | |
| 2014/0363711 | A1 | 12/2014 | Zhao | |
| 2017/0036563 | A1* | 2/2017 | Degner | B60L 15/04 |
| 2017/0054347 | A1* | 2/2017 | Lei | H01L 25/07 |

\* cited by examiner

POWER INVERTER ASSEMBLY FOR A VEHICLE

TECHNICAL FIELD

The present disclosure relates to power inverters for automotive vehicles.

BACKGROUND

Vehicles such as battery-electric vehicles (BEVs), plug-in hybrid electric vehicles (PHEVs) and fully hybrid-electric vehicles (FHEVs) contain a traction battery assembly to act as an energy source for one or more electric machines. The traction battery includes components and systems to assist in managing vehicle performance and operations. A power inverter is electrically connected between the battery and the electric machines to convert the direct current coming from the battery into alternating current compatible with the electric machines. The power inverter may also act as a rectifier to convert alternating current from the electric machines to direct current compatible with the battery.

SUMMARY

According to one embodiment, an electronic device for an electric powertrain of a vehicle is disclosed. The device includes a power module assembly having a housing that defines a first side, and an array of power modules disposed within the housing. Each of the power modules includes first electrical contact patches at least partially embedded in the first side and having an attachment surface substantially parallel to the first side. A capacitor assembly includes a housing defining a second side that is substantially coplanar with the first side, and an array of second electrical contact patches at least partially embedded in the second side. The second electrical contact patches have an attachment surface substantially parallel to the second side. A busbar mechanically and electrically couples at least one of the first contact patches to at least one of the second contact patches.

According to another embodiment, a power inverter includes a housing defining a planar surface and a power module assembly disposed in the housing. An array of first electrical contact patches are embedded in the planar surface and have an attachment surface substantially parallel to the planar surface. A capacitor is disposed in the housing and includes an array of second electrical contact patches embedded in the planar surface. Busbars couple the first contact patches to the second contact patches.

According to yet another embodiment, a power inverter includes power modules arranged in a stack such that adjacent modules cooperate to define coolant chambers interleaved with the modules. Each of the modules includes a half bridge enclosed by a frame, and a terminal extending outwardly from the half bridge and terminating at a contact patch at least partially embedded in an outer surface of the frame. The terminal has an attachment surface substantially parallel to the outer surface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
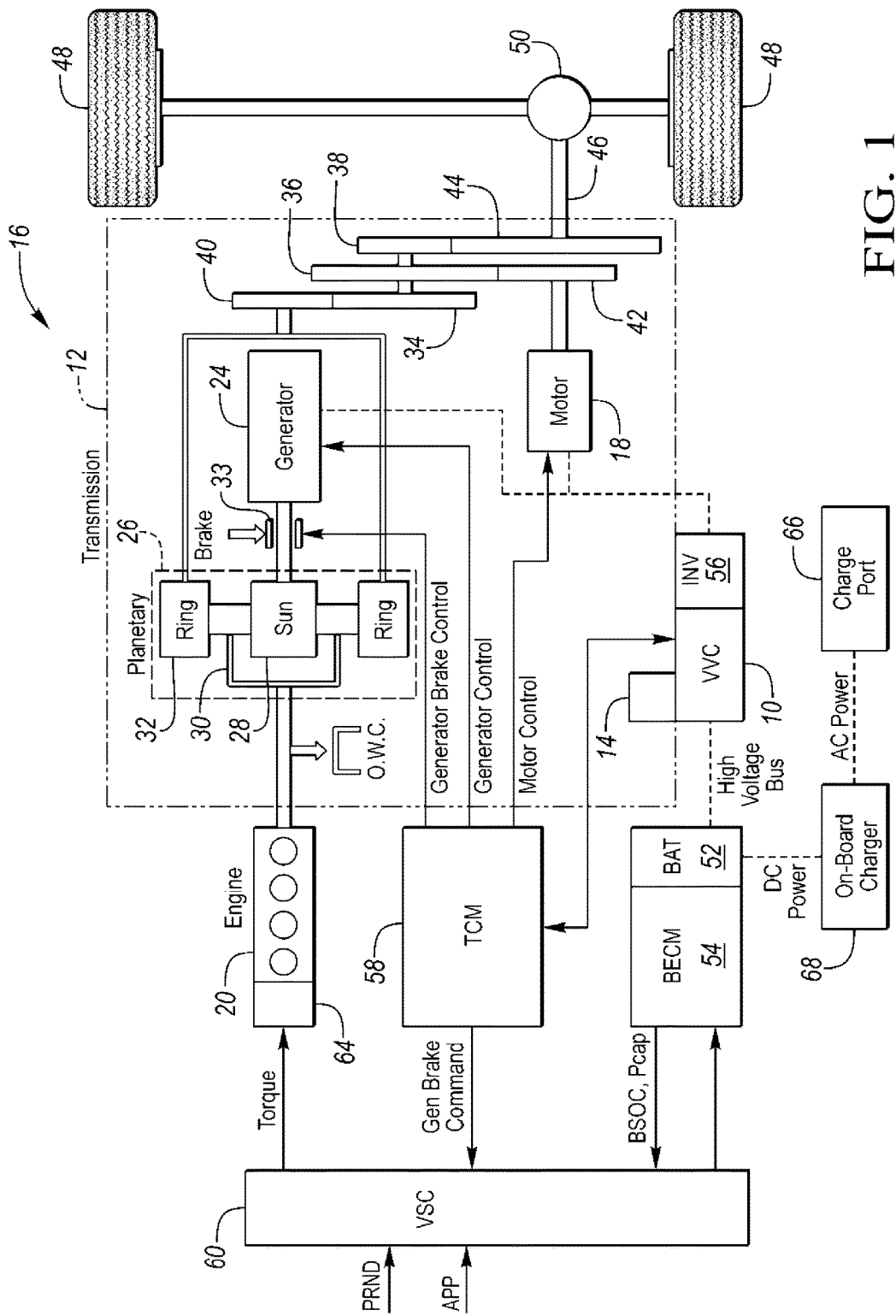
FIG. 1 is a schematic diagram of an example hybrid vehicle.

An example of a PHEV is depicted in FIG. 1 and referred to generally as a vehicle 16. The vehicle 16 includes a transmission 12 and is propelled by at least one electric machine 18 with assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one inverter associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the inverter 56 may be implemented on other types of electric vehicles, such as a HEV or a BEV.

Figure 2:
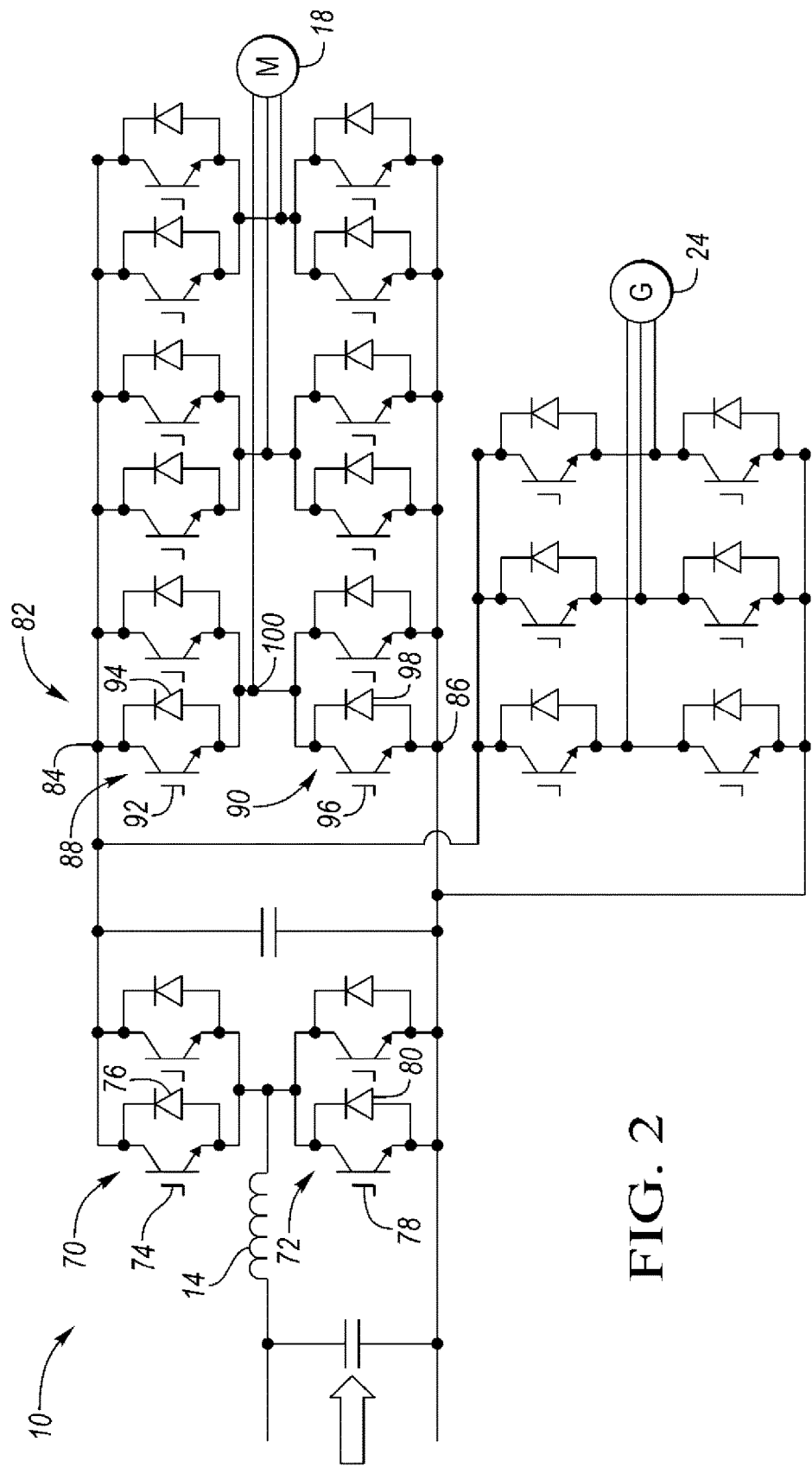
FIG. 2 is a schematic diagram of a variable voltage converter and a power inverter.

Referring to FIG. 2, an electrical schematic of the VVC 10 and the inverter 56 is shown. The VVC 10 may include a one or more power stages having a first switching unit 70 and a second switching unit 72 for boosting the input voltage ($V_{bat}$) to provide output voltage ($V_{dc}$). The first switching unit 70 may include a first transistor 74 connected in parallel to a first diode 76, but with their polarities switched (anti-parallel). The second switching unit 72 may include a second transistor 78 connected anti-parallel to a second diode 80. Each transistor 74, 78 may be any type of controllable switch (e.g., an insulated gate bipolar transistor (IGBT) or field-effect transistor (FET)). Additionally, each transistor 74, 78 may be individually controlled by the TCM 58. The inductor assembly 14 is depicted as an input inductor that is connected in series between the traction battery 52 and the switching units 70, 72. The inductor 14 generates magnetic flux when a current is supplied. When the current flowing through the inductor 14 changes, a time-varying magnetic field is created, and a voltage is induced. Other embodiments of the VVC 10 include alternative circuit configurations.

The inverter 56 may include a plurality of half-bridge power stages that are stacked in an assembly. Each of the half bridges may include a positive DC lead 84 that is coupled to a positive DC node from the battery and a negative DC lead 86 that is coupled to a negative DC node from the battery. Each of the half bridges 82 may also include a first switching unit 88 and a second switching unit 90. The first switching unit 88 may include a first transistor 92 connected in anti-parallel to a first diode 94. The second switching unit 90 may include a second transistor 96 connected in parallel to a second diode 98. The first and second transistors 92, 96 may be IGBTs or FETs. The first and second switching units 88, 90 of the each of the half-bridges 82 convert the DC power of the battery into a single phase AC output at the AC lead 100. Each of the AC leads 100 are electrically connected to the motor 18 or generator 24.

In the illustrated embodiment, the VVC 10 includes two power stages and the inverter includes 9 power stages, three for the generator 24, and six for the motor 18. In other embodiments, the VVC 10 includes 1 power stage and the inverter includes 6 power stages, three for the generator 24, and three for the motor 18. The VVC power stages and the inverter power stages may be identical components and generally referred to as power stages 82. Both the VVC power stages and the inverter power stages may be arranged in a common stack.

FIGS. 3 to 6 illustrate a power module assembly 57 according to a first embodiment. The power module assembly 57 includes a plurality of power modules 122 arranged in a stack. The power module assembly 57 includes a first power module 124 defining one end of the stack and a last power module 126 defining the other end of the stack. A first endplate 128 is disposed against the first module 124, and a second endplate 130 is disposed against the last module 126. The endplates cooperate to sandwich the stack and may provide compression to help hold the stack together.

Each of the power modules 122 includes a frame 132 having opposing major sides 134, 136 and minor sides 138 extending therebetween. In the illustrated embodiment, the frame 132 is a hollow rectangular body including a left side 140, a right side 142, a top 144, and a bottom 146 that all cooperate to define an exterior surface 150, an interior surface 148, a front surface 152, and a back surface 154. The frame 132 may have a different shape in other embodiments. The interior surface 148 defines an enclosure for receiving a power stage 82. The power stage 82 may include semiconductor devices as is shown in FIG. 2.

The power stage 82 includes opposing major sides 158 and a plurality of minor sides 160. The power stage 82 is received within the enclosure and is surrounded by the frame 132 on at least some of the minor sides 160. The power stage 82 includes a positive DC power terminal 162 and a negative DC power terminal 164 that each extend from the power stages towards the right side 142. The terminals may also be known as lead frames. Each of the terminals 162, 164 includes a stem 163 and an electrical contact patch 165 that forms an end of the terminal. The stem 163 and the contact patch 165 may be integrally formed. For example, the terminal may be manufactured by bending the outer region of the terminal approximately 90 degrees to form the stem and the contact patch. Each of the contact patches 165 includes an attachment surface 169. The attachment surface 169 may be substantially perpendicular to the longitudinal axis of the stem 163. Each of the contact patches 165 may be embedded in the right side 142 such that the attachment surface 169 is exposed and is substantially flush with (within 5 millimeters of) an outer surface of the right side 142. Each of the DC terminals may be connected to corresponding terminals of the capacitor module via a busbar. The busbar is mechanically and electrically coupled to the attachment surface 169.

An AC power terminal 166 of the power stage 82 extends through a hole defined in the bottom 146. The AC power terminals 166 are electrically connected to the electric machines. First and second signal pins 168, 170 of the power stage 82 extend through one or more holes defined in the left side 140. The signal pins 168, 170 may be electrically connected to the gate drive board (not shown). The location of the terminals and signal pins may vary by embodiment and are not limited to the configuration shown.

A first plate 172 is disposed against one of the major sides 158 of the power stage 82, and a second plate 174 is disposed against the other major side of the power stage 82. The first and second plates 172, 174 are arranged with a panel side 176 exposed and with at least some of the edges 178 engaging the interior surface 148 of the frame 132. The first and second plates 172, 174 may be metallic, plastic, composite or a combination thereof. The semiconductor devices of the power stage 82 may be encased in an epoxy 156 or other filler to electrically isolate the power stage from the plates and other components. Note: the epoxy is not cross-hatched for clarity.

The minor sides 138 of the frame 132 are thick enough to extend past the outer panel sides 176 of the plates 172, 174 in the longitudinal direction of the stack. The extended region of the frame 132, and the panel side 176 of each plate, cooperate to define a pair of pockets 180 recessed into the major sides of the power module 122. Each of the power modules 122 also includes an opening 184 defined between the frame 132 and the power stage 82. A divider 167 may be disposed within the opening 184.

Figure 3:
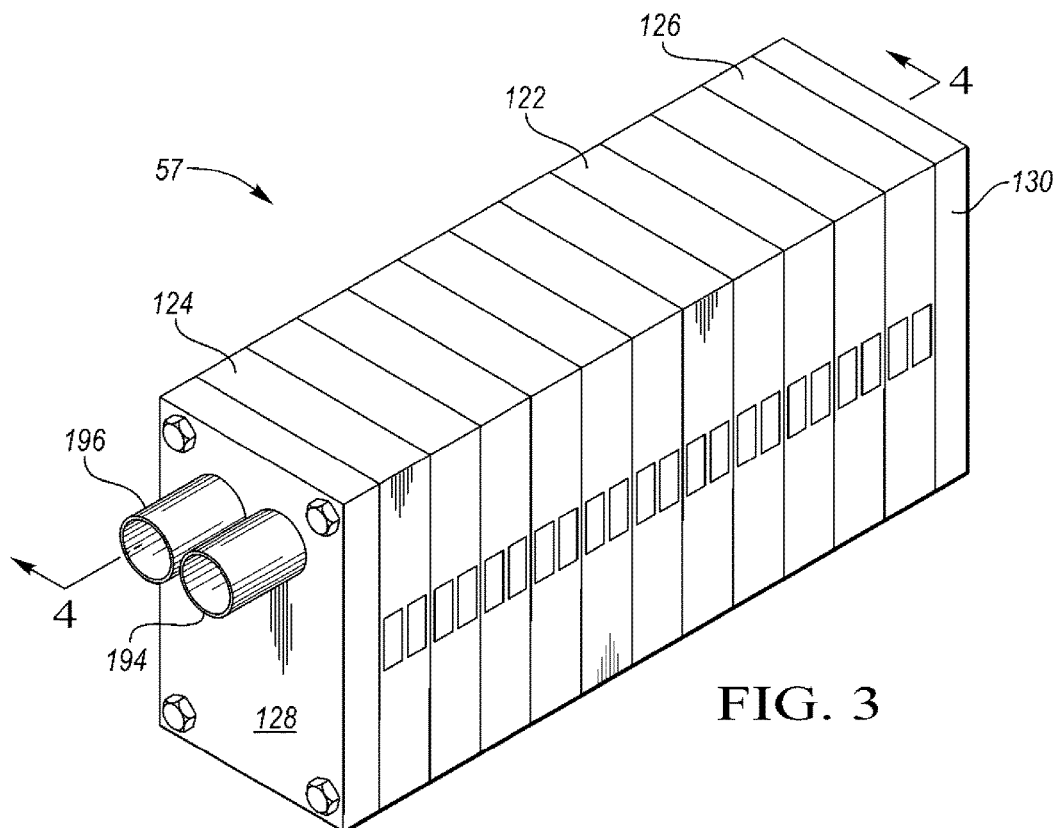
FIG. 3 is a perspective view of a power module assembly.
Figure 4:
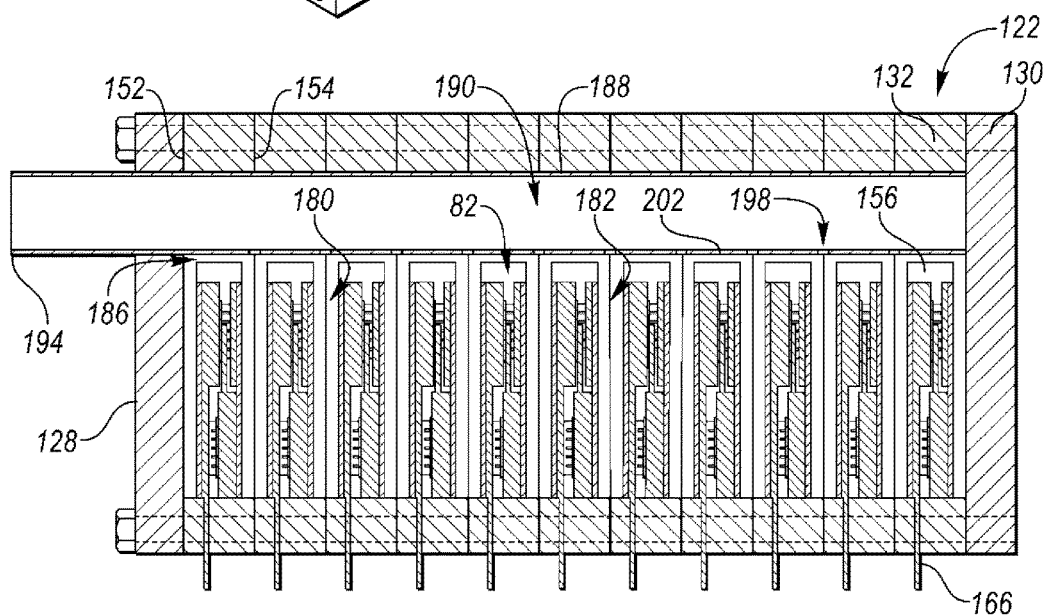
FIG. 4 is a side view, in cross-section, of the assembly of FIG. 3 along cut line 4-4.
Figure 5:
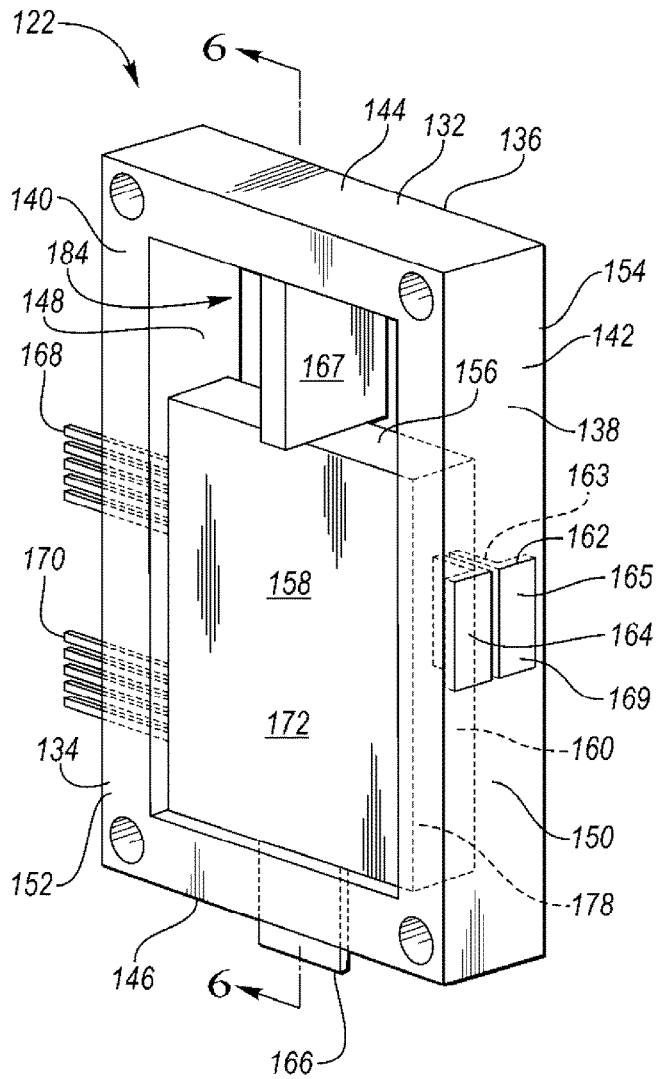
FIG. 5 is a perspective view of one of the modules of the assembly of FIG. 3.
Figure 6:
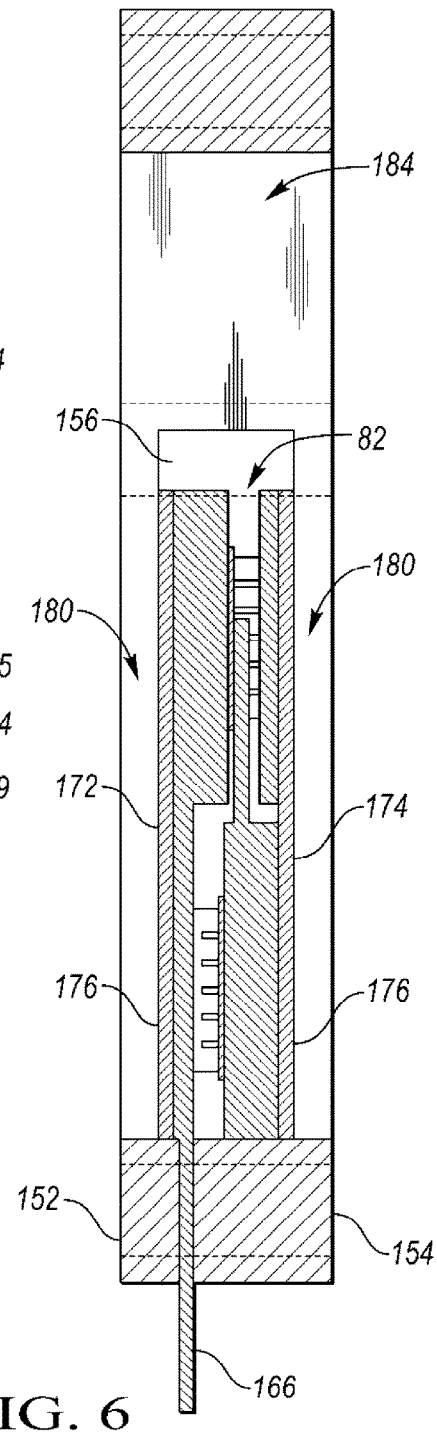
FIG. 6 is a side view, in cross-section, of the module of FIG. 5 along cut line 6-6.

As is best shown in FIGS. 3 and 4, the individual power modules 122 are arranged in a stack with the front and back surfaces 152, 154 of adjacent frames 132 being disposed against each other. When stacked, the pockets 180 of adjacent power modules 122 cooperate defining coolant chambers 182 interleaved with the modules 122. The endplates and the power modules may also cooperate to define some of the coolant chambers 182. For example, the first endplate 128 cooperates with the first module 124 to define an outer coolant chamber, and the second endplate 130 cooperates with last module 126 to define another outer coolant chamber. The outer coolant chambers may have a smaller volume than the interior coolant chambers, or the endplates may have a recessed area to provide outer coolant chambers having a same or similar volume as the interior coolant chambers. Alternatively, the outer coolant chambers may be omitted. For example, each of the endplates 128, 130 may include a protruding face that is received within the outer pocket of the first and last modules 124, 126 to fill the pocket. Each of the coolant chambers 182 may be bounded on five sides and may have an open top side. Each of the cooling chambers 182 may include channeling or other features to guide fluid circulating within the chamber.

The openings 184 in each of the modules 122 cooperate forming a cavity 186 that extends along a length of the stack. The open top side of each of the coolant chambers 182 opens into the cavity 186. A manifold 188 is received within the cavity 186 and extends along a length of the stack. The manifold 188 may include a supply chamber 190 and a return chamber (not shown). The chambers may be on opposite sides of the divider 167. In the illustrated embodiment, the supply chamber and the return chamber are positioned side by side, however, other configurations are contemplated. The supply chamber 190 includes a port 194 that connects with a supply line, and the return chamber includes a port 196 that connects with a return line. The supply and return lines form part of a larger thermal management system that may include pumps, radiators, conduits, valves, and other components. A bottom surface 202 of the manifold 188 is disposed over the open top side of each of the coolant chambers 182. The bottom surface 202 of the manifold 188 may act as a ceiling for the coolant chambers 182. The bottom surface 202 of the supply chamber 190 may include a plurality of inlets 198 placing the supply chamber 190 in fluid communication with each of the coolant chambers 182. The bottom surface of the return chamber may include a plurality of outlets placing the return chamber in fluid communication with each of the coolant chambers 182. During operation, pressurized coolant in the supply chamber 190 is circulated into each of the coolant chambers 182 to cool the power modules 122. The coolant exits from the coolant chambers 182 into the return chamber via the outlets. The channeling (if included) within each of the coolant chambers 182 helps guide fluid between the inlets 198 and the outlets. The dividers 167 help prevent coolant flowing directly from an inlet 198 to an outlet without flowing through the coolant chambers 182.

The coolant chambers 182 may be connected to the manifolds such the chambers are arranged in parallel flow paths. This arrangement provides a more uniform temperature gradient along the length of the stack because the coolant within the supply chamber 190 is relatively uniform. Coolant chambers arranged in series may have a relatively large temperature gradient, where coolant at the exit end of the stack is much hotter than at the entrance end of the stack. But, in some designs, a series cooling arrangement may be advantageous.

Figure 7:
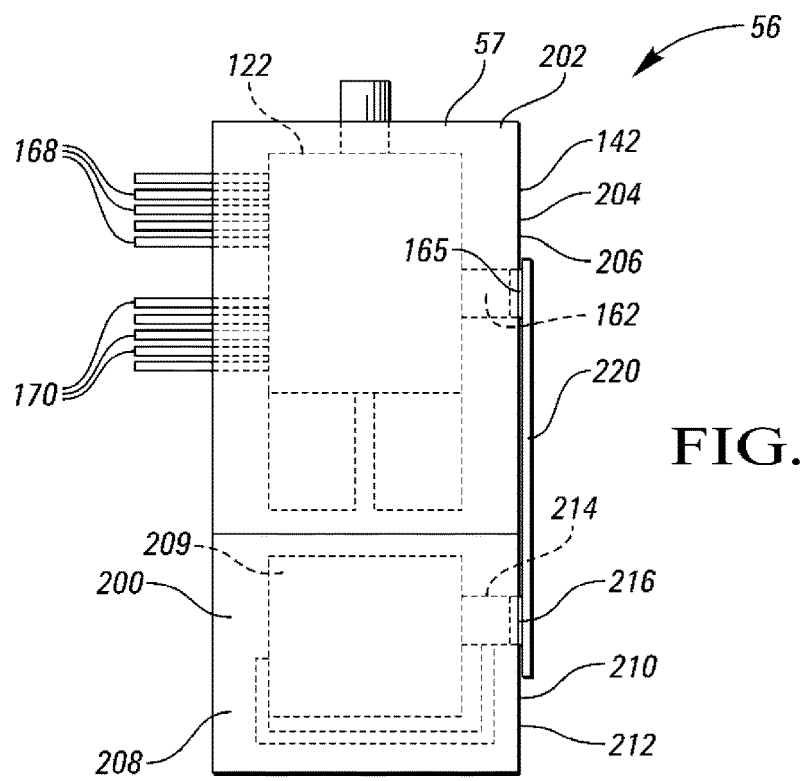
FIG. 7 is a back view of a power inverter including the power-module assembly of FIG. 3.

Referring to FIG. 7, a back view of the power inverter 56 is illustrated. In the illustrated embodiment, the power module assembly 57 is disposed on top of a capacitor assembly 200. In other embodiments, the orientation may be reversed, or the power module assembly 57 and the capacitor assembly 200 may be positioned in a side-by-side orientation. The frames 132 of the power modules 122 cooperate to generally define a housing 202 of the power module assembly 57. The housing 202 includes a first side 204, which is collectively formed by the right sides 142 of the frames 132. The first side 204 defines an outer planar surface 206.

The capacitor assembly 200 includes a housing 208 and a capacitor bank disposed within the housing. The capacitor bank includes one or more capacitors 209. The housing 208 may be filled with a potting material (such as epoxy) to secure and protect the capacitor 209. Alternatively, the potting material may be the housing 208. The housing 208 includes a second side 210 that defines an outer planar surface 212. The first side 204 and the second side 210 are arranged such that the outer planar surfaces 206, 212 are substantially coplanar.

The capacitor 209 includes at least one positive DC lead frame 214 and at least one negative lead frame (not shown). The lead frame 214 includes a contact patch 216 that is disposed in the second side 210. At least one busbar 220 mechanically and electrically couples the contact patch 216 to at least one of the contact patches 165 of the terminals 162.

Figure 8:
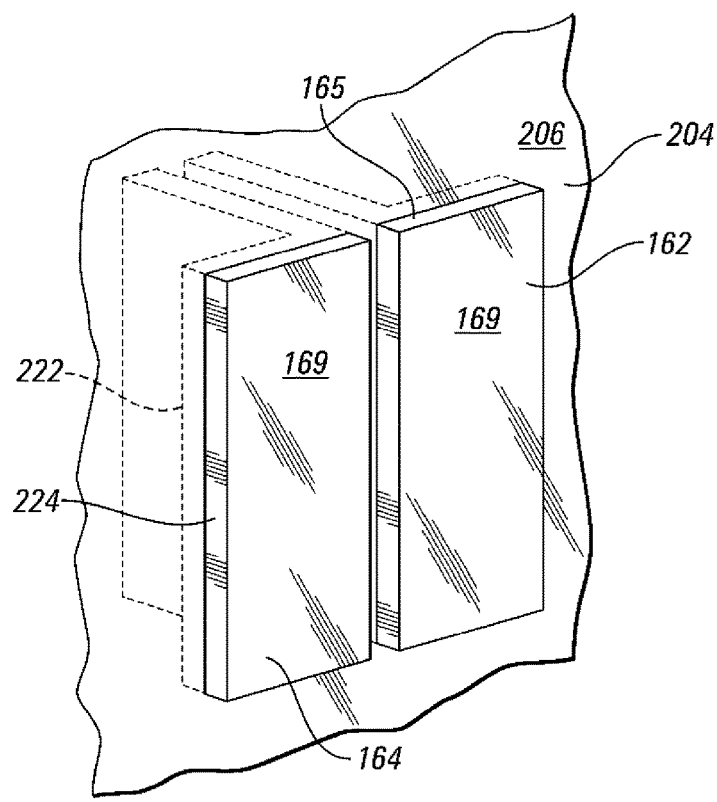
FIG. 8 is a magnified perspective view of a contact patch of the power-module assembly of FIG. 3.

Referring to FIG. 8, the contact patches 165 of each terminal 162, 164 are at least partially embedded in the first sidewall 204 such that the attachments surfaces 169 are exposed to the outside environment and are surrounded by a hole defined in the sidewall 204. For example, each of the contact patches 165 includes an embedded portion 222 and an exposed portion 224. The attachments surfaces 169 is the area where the contact patches 165 are coupled to the busbar. It is to be noted that this drawing is not to scale and that certain component dimensions are exaggerated for clarity purposes. While L-shaped terminals are shown, is to be appreciated that the terminals may have any shape suitable for creating a planar attachment surface, such as T-shaped terminals.

Figure 9:
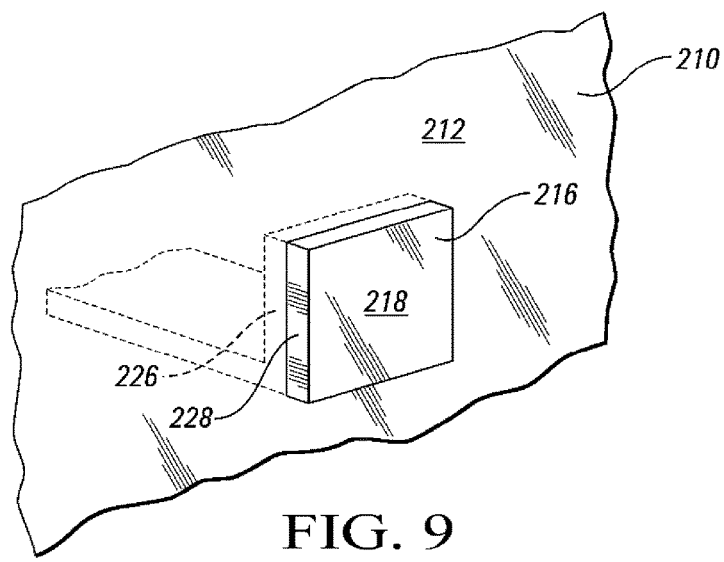
FIG. 9 is a magnified perspective view of a contact patch of a capacitor bank of the power inverter of FIG. 7.

Referring to FIG. 9, one of the contact patches 216 of the capacitor assembly 200 is shown. The contact patch 216 is at least partially embedded in the second side 210 of the housing 208 such that the attachment surface 218 is expose to the outside environment. For example, the contact patch 216 includes an embedded portion 226 and an exposed portion 228. The attachment surface 218 is the area where the contact patch 216 is coupled to the busbar. The attachment surface may be parallel to the outer planar surface 212, and may be substantially flush with the surface 212. It is to be noted that this drawing is not to scale and that certain component dimensions are exaggerated for clarity purposes. While L-shaped terminals are shown, is to be appreciated that the terminals may have any shape suitable for creating a planar attachment surface, such as T-shaped terminals.

Figure 10:
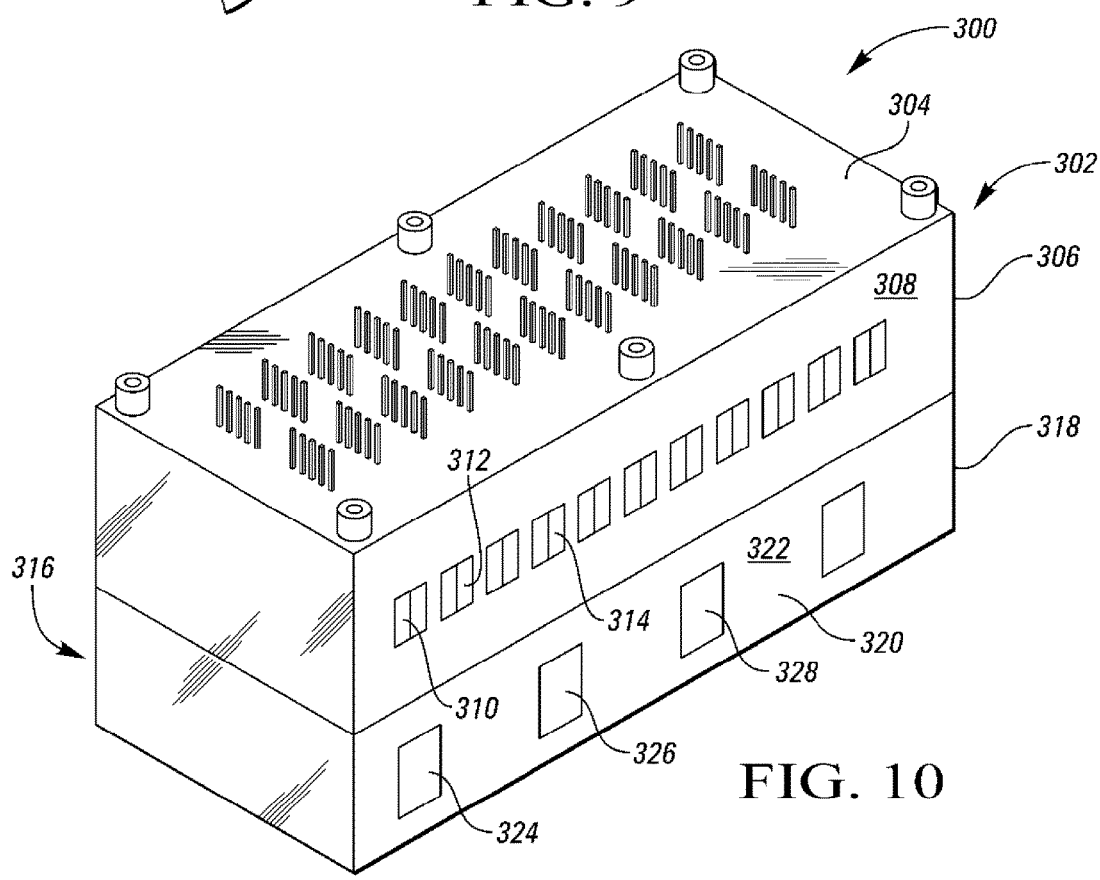
FIG. 10 is a perspective of another power inverter with the busbars removed for clarity.

Referring to FIG. 10, another power inverter 300 is illustrated. The power inverter 300 includes a power module assembly 302, a capacitor assembly 316, and a gate board drive (not shown). Unlike the power module assembly 57—which is formed of a plurality of framed power modules arranged in a stack and secured together—the power module assembly 302 may be formed by an over-molding process, which forms a continuous housing. A method for over molding a power module assembly is disclosed by U.S. patent application Ser. No. 14/687,468 the contents of which are hereby incorporated by reference in their entirety.

The power module assembly 302 includes a housing 304 having a first side 306 that defines an outer planar surface 308. A plurality of power stages or half bridges—that may be similar to power stage 82—are disposed within the housing 304. Each of the power stages includes a positive DC terminal having a positive contact patch 310, and a negative DC terminal having a negative contact patch 312. The contact patches 310, 312 are arranged in an array extending along the first side 306 in a first axial direction. The contact patches may alternate negative and positive along the length of the contact patch array. Each of the contact patches includes an attachment area 314 which is exposed from the housing and is configured to couple with a busbar. The contact patches 310, 312 may be partially embedded in the wall 306 as shown in FIG. 8.

The capacitor assembly 316 includes a housing 318 having a first side 320 that defines an outer planar surface 322. A capacitor bank is disposed within the housing 318 and includes one or more capacitors. The capacitor bank includes positive and negative DC terminals that include contact patches. For example the capacitor assembly 316 includes positive contact patches 324 and negative contact patches 326 that are disposed in the second side 320 of the housing 318. The contact patches 324, 326 may be disposed in the wall as shown in FIG. 10. In the illustrated embodiment, the capacitor assembly 316 includes an array of contact patches that extend across the second side 320 in a second axial direction. The second axial direction maybe parallel to the first axial direction. The array may include two positive contact patches 324 and two negative contact patches 326. The positive and negative contact patches may alternate along a length of the array. Each of the contact patches includes an attachment surface 328 that is exposed from the second side 320 and is configured to couple with a busbar.

The power module assembly 302 and the capacitor assembly 316 may be two separate assemblies that are stacked on top of each other (as shown) or may be stacked side by side. In some embodiments, assembly 302 and assembly 316 may be a single assembly. The assemblies may be secured together by bolts extend through the housings 304, 516. The assemblies 302, 316 are assembled such that the first side 306 and the second side 320 are substantially coplanar forming a continuous outer surface. The contact patches of the power module assembly 302 and the contact patches of the capacitor assembly 316 may be arranged such that the attachment surfaces 314 are substantially coplanar with the attachment surfaces 328. This allows for easier attachment of the busbars. When the attachments surfaces are coplanar, the busbars only need be aligned in two dimensions rather than three dimensions. This makes it much easier to fixture and attach the busbars to their respective attachments surfaces.

Figure 11:
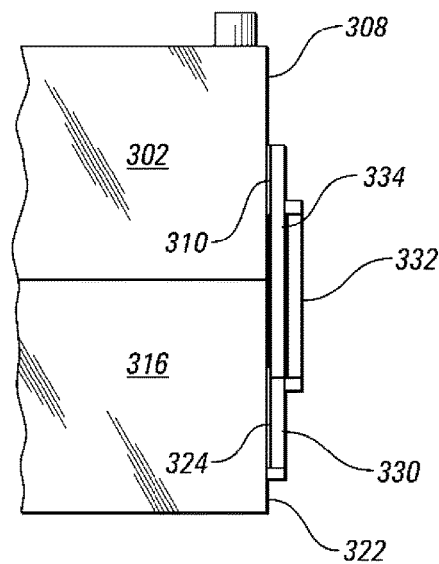
FIG. 11 is a back view of the power inverter of FIG. 10 with the busbars illustrated.
Figure 12:
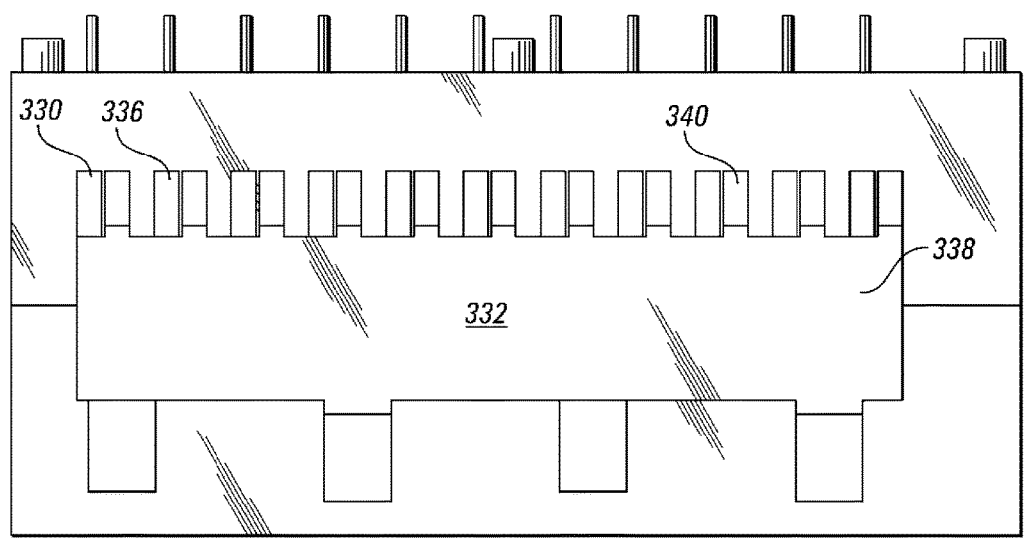
FIG. 12 is a side view of the power inverter of FIGS. 10 and 11 with the busbars illustrated.

FIGS. 11 and 12 illustrate bussing between the power module assembly 302 and the capacitor assembly 316. For example, the power inverter 300 may include a positive busbar 330 and a negative busbar 332. The positive busbar 330 is mechanically and electrically coupled to each of the positive contact patches 310 and to each of the positive contact patches 324. The busbar 330 may be connected to the contact patches via welding, brazing, fasteners or other mechanical connection. The busbar 330 includes attachment surfaces that are coupled to one of the attachment surfaces 314 and 328. The busbar 330 may include a main portion 334 and fingers 336. The fingers may be sized to correspond with the size of the contact patch that it is being connected to. For example, the fingers connected to the power module assembly 302 may be smaller than the fingers connected to the capacitor assembly 316. Alternatively, the busbar 330 may be a plurality of busbars that are connected to select contact patches of the power module assembly and select contact patches of the capacitor assembly. The negative busbar 332 is mechanically and electrically coupled to each of the negative contact patches 312 and to each of the negative contact patches 326. The negative busbar 332 may be similar to that of the positive busbar 330 and include a main portion 338 and fingers 340.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electronic device for an electric powertrain of a vehicle, the device comprising:
   a power module assembly including a housing defining a first side, and an array of power modules disposed within the housing in a linear stack, wherein the stack includes a plurality of coolant chambers interleaved with the power modules, and wherein each of the power modules includes a switching unit and first electrical contact patches, associated with the switching unit, at least partially embedded in the first side and having an attachment surface substantially parallel to the first side;
   a capacitor assembly including a housing defining a second side and attached to the power module assembly such that the second side is substantially coplanar with the first side, and an array of second electrical contact patches at least partially embedded in the second side and having an attachment surface substantially parallel to the second side; and
   a busbar mechanically and electrically coupling at least one of the first contact patches to at least one of the second contact patches.

2. The electronic device of claim 1 wherein the power module assembly and the capacitor assembly are stacked on top of each other.

3. The electronic device of claim 1 wherein each of the first electrical contact patches further includes a stem extending inwardly and connected to a corresponding one of the power modules.

4. The electronic device of claim 3 wherein a longitudinal axis of the stem is substantially perpendicular to the attachment surface.

5. The electronic device of claim 1 wherein the first electrical contact patches are positive direct current (DC) contact patches and each of the power modules further includes a negative DC contact patch at least partially embedded in the first side and having an attachment surface substantially parallel to the first side.

6. The electronic device of claim 1 wherein the attachment surfaces of the first electrical contact patches are flush with the first side.

7. The electronic device of claim 6 wherein the second electrical contact patches are flush with the second side.

8. An electronic device for an electric powertrain of a vehicle, the device comprising:
   a power module assembly including a housing defining a first side, and an array of power modules disposed within the housing, wherein each of the power modules includes first electrical contact patches at least partially embedded in the first side and having an attachment surface substantially parallel to the first side, wherein the first electrical contact patches are positive direct current (DC) contact patches and each of the power modules further includes a negative DC contact patch at least partially embedded in the first side and having an attachment surface substantially parallel to the first side;

a capacitor assembly including a housing defining a second side that is substantially coplanar with the first side, and an array of second electrical contact patches at least partially embedded in the second side and having an attachment surface substantially parallel to the second side, wherein the second electrical contact patches are positive DC contact patches and the capacitor assembly further includes a negative DC contact patch at least partially embedded in the second side and having an attachment surface substantially parallel to the second side; and a busbar mechanically and electrically coupling at least one of the first contact patches to at least one of the second contact patches.

9. The electronic device of claim 8 further comprising another busbar mechanically and electrically coupling at least one of the negative DC contact patches of the power module assembly to at least one of the negative DC contact patches of the capacitor assembly.

10. A power inverter comprising:

a housing defining a planar surface;

a power module assembly disposed in the housing and including an array of first electrical contact patches embedded in the planar surface and having an attachment surface substantially parallel to the planar surface;

a capacitor disposed in the housing and including an array of second electrical contact patches embedded in the planar surface; and busbars coupling the first contact patches to the second contact patches.

11. The power inverter of claim 10 wherein the second electrical contact patches have an attachment surface substantially parallel to the planar surface.

12. The power inverter of claim 10 wherein the power module assembly includes an array of power modules and wherein each of the first electrical contact patches further includes a stem extending inwardly and connected to a corresponding one of the power modules.

13. The power inverter of claim 12 wherein the stem is substantially perpendicular to the attachment surface.

14. The power inverter of claim 10 wherein the housing defines a first chamber having the power module assembly disposed therein and a second chamber having the capacitor disposed therein.

15. The power inverter of claim 10 wherein the first electrical contact patches are positive direct current (DC) contact patches and wherein each of the power modules further includes a negative DC contact patch at least partially embedded in the planar surface and having an attachment surface substantially parallel to the planar surface.

16. The power inverter of claim 10 wherein the attachment surface is flush with the planar surface.

17. The power inverter of claim 10 wherein the power module assembly includes an array of power modules arranged in a linear stack.

18. The power inverter of claim 17 wherein the stack includes a plurality of coolant chambers interleaved with the power modules.

19. The power inverter of claim 10 wherein the first electrical contact patches are positive direct current (DC) contact patches and the power module assembly further includes an array of negative DC contact patches embedded in the planar surface and having an attachment surface substantially parallel to the planar surface, and wherein the second electrical contact patches are positive DC contact patches and the capacitor further includes an array of negative DC contact patches embedded in the planar surface and having an attachment surface substantially parallel to the planar surface.

20. The power inverter of claim 19 further comprising another busbar mechanically and electrically coupling at least one of the negative DC contact patches of the power module assembly to at least one of the negative DC contact patches of the capacitor.

* * * * *